(12) United States Patent
Kim et al.

(10) Patent No.: US 9,008,158 B2
(45) Date of Patent: Apr. 14, 2015

(54) APPARATUS FOR TRANSMITTING AND RECEIVING SIGNAL IN COMMUNICATION SYSTEM

(71) Applicant: Electronics and Telecommunications Research Institute, Daejeon (KR)

(72) Inventors: Kwang-Seon Kim, Daejeon (KR); Bong-Su Kim, Daejeon (KR); Min-Soo Kang, Daejeon (KR); Woo-Jin Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 113 days.

(21) Appl. No.: 13/667,485

(22) Filed: Nov. 2, 2012

(65) Prior Publication Data

US 2014/0064339 A1 Mar. 6, 2014

(30) Foreign Application Priority Data

Sep. 6, 2012 (KR) .................. 10-2012-0098875

(51) Int. Cl.
*H04B 1/38* (2006.01)
*H04L 5/00* (2006.01)
*H04J 3/06* (2006.01)

(52) U.S. Cl.
CPC ............ *H04L 5/0051* (2013.01); *H04J 3/0685* (2013.01)

(58) Field of Classification Search
USPC ........... 375/219, 295, 340; 370/474, 503, 337
See application file for complete search history.

(56) References Cited

U.S. PATENT DOCUMENTS

| | | | | |
|---|---|---|---|---|
| 5,495,498 | A * | 2/1996 | Tominaga | 375/150 |
| 5,550,992 | A * | 8/1996 | Hashimoto | 370/337 |
| 8,170,144 | B2 * | 5/2012 | Suh et al. | 375/316 |
| 2007/0121762 | A1 | 5/2007 | Mizukami | |
| 2009/0110133 | A1 * | 4/2009 | Suh et al. | 375/354 |
| 2009/0279572 | A1 * | 11/2009 | Takada et al. | 370/503 |
| 2011/0122932 | A1 | 5/2011 | Lovberg et al. | |
| 2013/0266027 | A1 * | 10/2013 | Takada et al. | 370/474 |

OTHER PUBLICATIONS

Soon-Woo Lee, et al; "Simple threshold estimation for a 1-bit ADC in a low complex IR-UWB receiver", Proceedings of the 2008 IEEE International Conference on Ultra-Wideband (ICUWB2008), vol. 2; Sep. 10-12, 2008; pp. 215-217.

* cited by examiner

*Primary Examiner* — Eva Puente
(74) *Attorney, Agent, or Firm* — Ladas & Parry LLP

(57) ABSTRACT

Disclosed uses a digital to analog converter and an analog to digital converter that process a low bit for processing of a data signal at high speed according to analog to digital conversion and digital to analog conversion in a communication system and an analog to digital converter that processes high bit for processing of a signal for synchronization acquisition at low speed.

17 Claims, 6 Drawing Sheets

APPARATUS FOR TRANSMITTING AND RECEIVING SIGNAL IN COMMUNICATION SYSTEM

CROSS-REFERENCE TO RELATED APPLICATIONS

The present application claims priority of Korean Patent Application No. 10-2012-0098875, filed on Sep. 6, 2012, which is incorporated herein by reference in its entirety.

BACKGROUND OF THE INVENTION

1. Field of the Invention

Exemplary embodiments of the present invention relate to a communication system, and more particularly, to an apparatus for transmitting and receiving a signal capable of transmitting and receiving data by improving digital to analog modulation or analog to digital modulation performance in a communication system.

2. Description of Related Art

An apparatus for transmitting and receiving a signal in a communication system requires a wide bandwidth of several GHz so as to transmit ultra high-speed data of several Gbps or more. In order to process the signal having a wide bandwidth, the signal is processed by a single channel using an analog to digital converter (ADC) or a digital to analog converter (DAC) processing a high bit and operated at high speed. Further, the signal is processed by a plurality of channels using the analog to digital converter (ADC) or the digital to analog converter (DAC) processing a high bit and operated at high speed.

The use of analog to digital converter (ADC) or the digital to analog converter (DAC) processing a high bit and operated at high speed requires expensive components and has a very complicated structure capable of performing low-speed conversion and performing data in parallel so as to perform digital processing. The use of the analog to digital converter or the digital to analog converter easily implements a radio frequency (RF) unit, but hardly implements a digital unit or is difficult to adopt several compensation methods.

To the contrary, the use of the analog to digital converter or the digital to analog converter processing a high bit and operated at high speed has a low digital processing speed and therefore, may increase performance as maximally as possible and may be easily implemented. However, the use of the analog to digital converter or the digital to analog converter requires a plurality of baseband (BB) unit or the radio frequency (RF) unit and therefore, increases costs and is difficult to constantly maintain characteristics for a plurality of paths and increase a size.

As such, due to the problems of the apparatus for transmitting and receiving a signal using a millimeter wave, most of the apparatuses for transmitting and receiving a signal use a simple modulation type such as a frequency shift keying (FSK) type or an on off keying (OOK) type or use a differential phase shift keying (DPSK) type so as to simplify a structure of a receiving apparatus. However, when using the simple modulation type, a digital modulation speed may be degraded.

Therefore, the apparatus for transmitting and receiving a signal using a wide bandwidth, for example, the apparatus for transmitting and receiving a millimeter wave needs to have a simple structure so as to optimize digital modulation performance and reduce costs.

SUMMARY OF THE INVENTION

An embodiment of the present invention is directed to an apparatus for transmitting and receiving a signal capable of improving digital to analog modulation and analog to digital modulation performance in a communication system.

In addition, another embodiment of the present invention is directed to an apparatus for transmitting and receiving having a simple structure for implementing low cost in a communication system.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

An apparatus for transmitting a signal in a communication system, includes: a frame maker configured to generate a frame for transmission from a baseband signal; a modulator configured to modulate the frame into a plurality of modulated signals; a digital to analog converter configured to convert the modulated signals into the analog signal; a clock generator configured to generate a clock signal for an operation of the analog to digital converter; a low pass filter block configured to filter the analog signals in preset bands; a frequency up converter configured to convert the filtered analog signals into frequency up converted signals; a local oscillator configured to generate a local oscillation signal for the frequency up conversion; and a clock controller configured to control the generation of the local oscillation signal and the generation of the clock signal based on the synchronization information.

An apparatus for receiving a signal in a communication system, includes: a frequency down converter configured to convert received signals into a frequency down converted signals according to a local oscillation signal; a first analog to digital converter configured to convert the frequency down converted signals into first digital signals; a clock generator configured to generate a clock signal for an operation of the first analog to digital converter; a demodulator configured to output a baseband signal demodulating the first digital signals; a low pass filter configured to perform low pass filtering on the frequency down converted signals; a second analog to digital converter configured to convert the filtered frequency down converted signals into second digital signals; a divider configured to divide the clock signal for an operation of the second analog to digital converter; a synchronizer configured to acquire synchronization information from the second digital signals; and a clock controller configured to control the generation of the local oscillation signal and the generation of the clock signal based on the synchronization information.

An apparatus for transmitting and receiving a signal in a communication system, includes: a frame maker configured to generate a frame for transmission from a baseband signal; a modulator configured to modulate the frame into a plurality of modulated signals; a digital to analog converter configured to convert the modulated signals into the analog signal; a low pass filter block configured to filter the analog signals in preset bands; a frequency up converter configured to convert the filtered analog signals into frequency up converted signals; a frequency down converter configured to convert received signals into frequency down converted signals; a first analog to digital converter configured to convert the frequency down converted signals into first digital signals; a demodulator configured to demodulate the first digital signals with a baseband signal; a low pass filter configured to perform low pass filtering on the frequency down converted signals; a second analog to digital converter configured to convert the filtered frequency down converted signals into second digital signals; a synchronizer configured to acquire synchronization information from the second digital signals; and a clock controller configured to control the generation of the local oscillation signal and the generation of the clock signal based on the synchronization information.

DESCRIPTION OF SPECIFIC EMBODIMENTS

The foregoing objects, features and advantages will become more apparent from the following description of preferred embodiments of the present invention with reference to accompanying drawings, which are set forth hereinafter. Accordingly, those having ordinary knowledge in the related art to which the present invention pertains will easily embody technical ideas or spirit of the present invention. Further, when technical configurations known in the related art are considered to make the contents obscure in the present invention, the detailed description thereof will be omitted. Hereinafter, exemplary embodiments of the present invention will be described in detail with reference to the accompanying drawings.

A case in which any one part is connected with the other part includes a case in which the parts are directly connected with each other and a case in which the parts are indirectly connected with each other with other elements interposed therebetween. In addition, unless explicitly described otherwise, "comprising" any components will be understood to imply the inclusion of other components but not the exclusion of any other components.

The present invention proposed an apparatus for transmitting and receiving a signal in a signal transceiver of a communication system. Further, although the embodiment of the present invention describes, by way of example, the signal transceiver for transmitting and receiving a signal through a frequency of a millimeter band, the signal transceiver may be used even in other frequencies in addition to the millimeter wave band.

Further, the embodiment of the present invention uses a digital to analog converter and an analog to digital converter that processes a low bit (representing a bit less than a predetermined critical bit number) at high speed (representing a speed of a predetermined critical speed or more) at the time of processing a data signal according to analog to digital conversion and digital to analog conversion in a communication system and uses an analog to digital converter that processes a high bit at a low speed (representing a speed less than a predetermined critical speed) at low speed at the time of processing a signal for synchronization acquisition. In this way, the present invention may implement the signal transceiver capable of reducing cost and power consumed to transmit a signal in a millimeter band.

Figure 1:
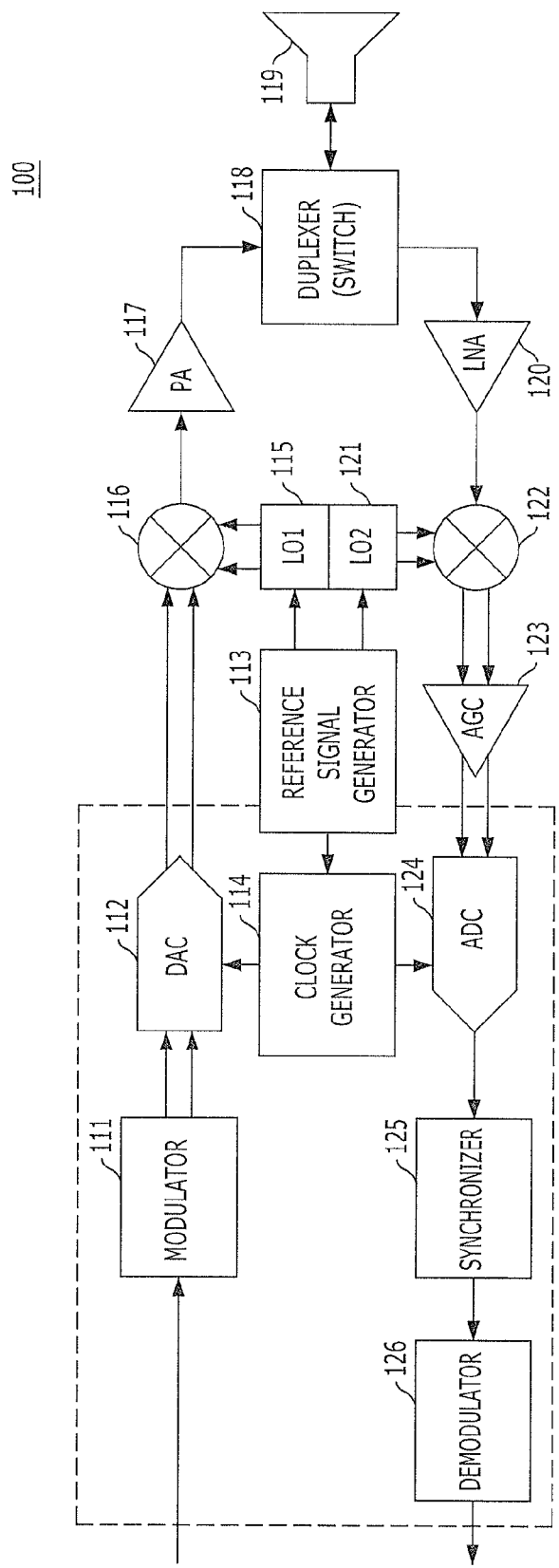
FIG. 1 is a diagram schematically illustrating a structure of a signal transceiver using a digital modulation type in a general communication system.

FIG. 1 is a diagram schematically illustrating a structure of a signal transceiver using a digital modulation type in a general communication system.

Referring to FIG. 1, a signal transceiver 100 may be configured to include a modulator 111, a digital to analog converter (DAC) 112, a reference signal generator 113, a clock generator 114, a first local oscillator (LO) 115, a frequency up converter 116, a power amplifier (PA) 117, a duplexer (or switch) 118, an antenna 119, a low noise amplifier (LNA) 120, a second local oscillator 121, a frequency down converter 122, an automatic gain controller (AGC) 123, an analog to digital converter (ADC) 124, a synchronizer 125, and a demodulator 126.

The modulator 111 modulates a signal in an input baseband. The modulator 111 outputs the modulated signal to the digital to analog converter 112.

The digital to analog converter 112 converts the modulated signal into an analog signal. In this configuration, the digital to analog converter 112 is a high bit (n-bit) (high speed) digital to analog converter. The digital to analog converter 112 outputs the converted analog signal to the frequency up converter 116.

The reference signal generator 113 generates reference signals for an operation of the clock generator 114 and the local oscillators 115 and 121. The reference signal generator 113 outputs a reference signal for generating a clock signal to the clock generator 114. In addition, the reference signal generator 113 outputs a reference signal for generating a local oscillation signal to the local oscillators 115 and 121.

The clock generator 114 generates a clock signal for an operation of the digital to analog converter 112 and the analog to digital converter 124 based on the reference signal. The clock generator 114 outputs the generated clock signal to the digital to analog converter 112 and the analog to digital converter 124.

The first local oscillator 115 generates a first local oscillation signal based on the reference signal. The first local oscillator 115 outputs the first local oscillation signal for frequency up conversion to the frequency up converter 116.

The frequency up converter 116 performs the frequency up conversion on the analog signal using the received first local oscillation signal. The frequency up converter 116 outputs the frequency up converted signal to the power amplifier 117.

The power amplifier 117 amplifies power of the frequency up converted signal. The power amplifier 117 outputs the power amplified signal to the duplexer 118.

The duplexer 118 is connected with the antenna 119 and outputs the power amplified signal to the antenna 119. In addition, the duplexer 118 outputs the signal received from the antenna 119 to the low noise amplifier 120. In this configuration, the duplexer 118 may control a path of the signal transmitted and received through the antenna 119 and may be implemented as a switch.

The antenna 119 transmits the signal received from the duplexer 118 in the air and outputs the signal received from the air to the duplexer 118.

The low-noise amplifier 120 low-noise amplifies the signal input from the duplexer 118. The low-noise amplifier 120 outputs the low-noise amplified signal to the frequency down converter 122.

Meanwhile, the second local oscillator 121 generates a second local oscillation signal based on the reference signal. The second local oscillator 121 outputs the second local oscillation signal for frequency up conversion to the frequency down converter 122.

The frequency down converter 122 performs the frequency down conversion on the low-noise amplified signal using the received second local oscillation signal. The frequency down converter 122 outputs the frequency down converted signal to the automatic gain controller 123.

The automatic gain controller 123 controls a gain to constantly maintain the gain for the frequency down converted signal. The automatic gain controller 123 outputs a gain controlled signal to the analog to digital converter 124.

The digital to analog converter 124 converts the gain controlled signal into a digital signal. In this configuration, the analog to digital converter 124 is a high bit (n-bit) (high speed) analog to digital converter. The analog to digital converter 124 outputs the digital converted signal to the synchronizer 125.

The synchronizer 125 performs the signal processing for synchronizing between the frequency and signal of the digital converted signal. Further, the synchronizer 125 may perform the signal processing for channel compensation of the digital converted signal. As such, the synchronizer 125 outputs the signal processed signal to the demodulator 126.

The demodulator 126 demodulates the signal processed signal to be output in a baseband.

As such, the signal transceiver 100 performing the digital modulation and demodulation ensures a signal to noise ratio (SNR) of the signal and uses the high-bit (high-speed) digital to analog converter 112 or the high-bit (high-speed) analog to digital converter 124 of for accurately synchronizing the signal.

For example, when the signal transceiver 100 performs communications using a millimeter wave in several GHz bands, the signal transceiver 100 requires a high symbol rate. As the high symbol rate is required, the signal transceiver 100 uses an oversampling method so as to remove aliasing in the digital to analog conversion (or, analog to digital conversion), such that the signal transceiver 100 requires the higher speed digital to analog converter (or analog to digital converter). In addition, in order to maintain the high signal to noise ratio, there is a need to use a high bit required for the digital to analog converter or the analog to digital converter of the signal transceiver 100. However, the digital to analog converter and the analog to digital converter having the function are very expensive and require high power consumption.

The present invention proposes the signal transceiver capable of transmitting a signal in several GHz bands (for example, a millimeter wave band) without increasing cost and power consumption.

To this end, the present invention uses the digital to analog converter and the analog to digital converter that are operated at high speed of low bit (for example, 1 bit) and adds the analog to digital converter that is operated at low speed of high bit to a receiving path. As such, a structure of the signal transceiver proposed by the present invention will be described in detail with reference to FIG. 2.

Figure 2:
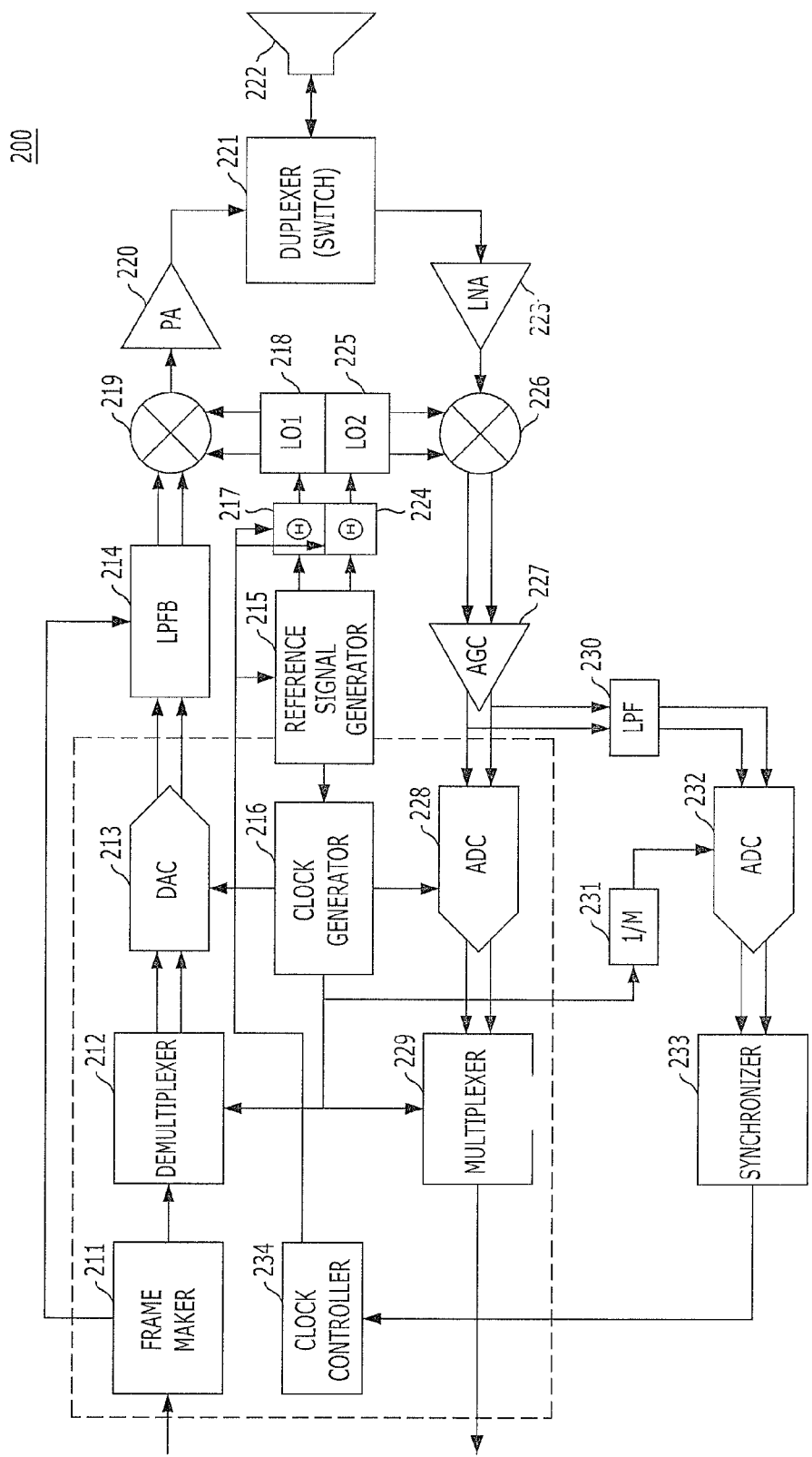
FIG. 2 is a diagram illustrating a structure of the signal transceiver using a low-bit analog to digital conversion technology in a communication system in accordance with an embodiment of the present invention.

FIG. 2 is a diagram illustrating a structure of the signal transceiver using a low-bit analog to digital conversion technology in a communication system in accordance with an embodiment of the present invention.

Referring to FIG. 2, a signal transceiver 200 may include a frame maker 211, a demultiplexer (DEMUX) 212, a digital to analog converter 213, a low pass filter block (LPFB) 214, a reference signal generator 215, a clock generator 216, a first phase shifter 217, a first local oscillator 218, a frequency up converter 219, a power amplifier 220, a duplexer (or switch) 221, an antenna 222, a low noise amplifier 223, a second phase shifter 224, a second local oscillator 225, a frequency down converter 226, an automatic gain controller 227, a first analog to digital converter 228, a multiplexer (MUX) 229, a low pass filter (LPF) 230, a clock divider 231, a second analog to digital converter 232, a synchronizer 233, and a clock controller 234.

The frame maker 211 uses the signal in the input baseband to make a frame. The frame maker 211 outputs the made frame to the demultiplexer 212. The frame made by the frame maker 211 may include a preamble and a payload. The preamble made by the frame maker 211 includes a pilot (sinusoidal signal) and a training sequence (CAZAC sequence) and sets a period of the pilot (sinusoidal signal) and a symbol rate of a training sequence (CAZAC sequence) to a low frequency as maximally as possible. Here, the frame structure made by the frame maker 211 will be described with reference to FIG. 3.

The demultiplexer 212 generates demultiplexed signals through demultiplexing of the frame. Here, the demultiplexed signals are the modulated signals. The demultiplexer 212 outputs the plurality of demultiplexed signals to the digital to analog converter 213.

The digital to analog converter 213 converts the plurality of demultiplexed signals into analog signals. In this configuration, the digital to analog converter 213 is a low-bit (for example, 1 bit) (high-speed) digital to analog converter. The digital to analog converter 213 outputs the converted analog signals to the low pass filter block 214.

The low pass filter block 214 filters signals of a frequency in a band lower than a predetermined frequency from the analog signals. The low pass filter block 214 outputs the filtered signals to the first frequency up converter 219.

The reference signal generator 215 generates reference signals (or, reference frequency signals) for the operation of the clock signal generator 216 and the phase shifters 217 and 224. In this configuration, the reference signal generator 215 may generate the reference signals according to the control of the clock controller 234 at the time of generating the reference signals. The reference signal generator 215 outputs the reference signal for generating a clock signal to the clock generator 216. In addition, the reference signal generator 215 outputs a reference signal for shifting a phase to the phase shifters 217 and 224.

The clock generator 216 generates a clock signal for an operation of the digital to analog converter 213 and the analog to digital converters 228 and 232 based on the reference signal. The clock generator 216 outputs the generated clock signal to the digital to analog converter 213, the analog to digital converter 228, the clock divider 231, the demultiplexer 212, and the multiplexer 229.

The first phase shifter 217 generates a first phase shift signal for shifting the phase of the first local oscillator 218 from the reference signal. The first phase shifter 217 may generate the first phase shift signal for controlling an output phase of the reference frequency according to the control of the clock controller 234. The first phase shifter 217 outputs the generated first phase shift signal to the first local oscillator 218.

The first local oscillator 218 generates the first local oscillation signals corresponding to each of the filtered signals. The first local oscillation signals are signals having, for example, in-phase (I) quadrature phase (Q) outputs. The first local oscillator 218 outputs the first local oscillation signals (up frequencies) for frequency up conversion to the frequency up converter 219.

The frequency up converter 219 receives the filtered signals and the first local oscillation signals. The frequency up converter 219 mixes the filtered signals with the first local oscillation signals to generate the frequency up converted signal. The frequency up converter 219 outputs the frequency up converted signals to the power amplifier 220.

The power amplifier 220 amplifies power of the frequency up converted signal. The power amplifier 220 outputs the power amplified signal to the duplexer 221.

The duplexer 221 is connected with the antenna 222 and outputs the power amplified signal to the antenna 222. In addition, the duplexer 221 outputs the signal received from the antenna 222 to the low noise amplifier 223. In this configuration, the duplexer 221 may control a path of the signal transmitted and received through the antenna 222 and may also be implemented as a switch.

The antenna 222 transmits the signal received from the duplexer 118 in the air and outputs the signal received from the air to the duplexer 221.

The low-noise amplifier 223 low-noise amplifies the signal received from the duplexer 221. The low-noise amplifier 223 outputs the low-noise amplified signal to the frequency down converter 226.

Meanwhile, the second phase shifter 224 generates a second phase shift signal for shifting the phase of the second local oscillator 225 from the reference signal. The second phase shifter 224 may generate the second phase shift signal for controlling the output phase of the reference frequency according to the control of the clock controller 234. The second phase shifter 224 outputs the generated second phase shift signal to the second local oscillator 225. In addition, the first phase shifter 217 and the second phase shifter 224 are separately divided, but may also be configured by a single phase shifter controlling the first local oscillator 218 and the second local oscillator 225.

The second local oscillator 225 generates the second local oscillation frequencies (down frequencies) for generating the plurality of frequency down converted signals from the low-noise amplified signal. The second local oscillation signals are signals having, for example, in-phase (I)/quadrature phase (Q) outputs. The second local oscillator 225 outputs the second local oscillation signals for frequency down conversion to the frequency down converter 226. In addition, the second local oscillator 225 may be configured by a single local oscillator coupled with the first local oscillator 218.

The frequency down converter 226 performs the frequency down conversion on the low-noise amplified signal using the received second local oscillation signal. The frequency down converter 226 outputs the frequency down converted signals to the automatic gain controller 227.

The automatic gain controller 227 controls a gain to constantly maintain the gain for the frequency down converted signals. The automatic gain controller 227 outputs the gain controlled signals to the first analog to digital converter 228 so as to be output to the low pass filter 230 located in another receiving path.

The first analog to digital converter 228 converts the gain controlled signals into the digital signals. In this configuration, the first analog to digital converter 228 is a low-bit (for example, 1 bit) (high-speed) analog to digital converter. The first analog to digital converter 228 outputs the digital converted signals to the multiplexer 229.

The multiplexer 229 multiplexes the digital converted signals into a single signal to generate a baseband signal. Here, the baseband signal is the demodulated signals. The multiplexer 229 outputs the baseband signal.

In this case, the low pass filter 230 located in another path filters the signals of frequency of lower band than the predetermined frequency from the gain controlled signals. The low pass filter 230 outputs the filtered signals to the second analog to digital converter 232.

The clock divider 231 divides the clock signal by, for example, 1/M period (M is a natural number). The clock divider 231 outputs the divided clock signal to the second analog to digital converter 232.

The second analog to digital converter 232 converts the filtered signals into the digital signal according to the divided clock signal. Here, the second analog to digital converter 232 is an analog to digital converter that can process high-bit (for example, n-bit) data for synchronization acquisition. In this case, the second analog to digital converter 232 is an analog to digital converter that is operated at low speed. Here, the second analog to digital converter 232 outputs the digital converted signal to the synchronizer 234.

The synchronizer 233 extracts the synchronization information, for example, frequency information, phase information, and time information for synchronization acquisition from the digital converted signal. The synchronizer 233 outputs the extracted synchronization information to the clock controller 234.

The clock controller 234 uses the synchronization information to output a clock control signal for controlling the reference signal (for generating a clock signal) input to the clock generator 216 to the reference signal generator 215. The clock controller 234 uses the synchronization information to output a phase control signal for controlling the generation of the phase shift signal (for controlling the output phase of the local oscillation signal) input to the local oscillators 218 and 225 to the phase shifters 217 and 224.

Meanwhile, the demultiplexer 212 generates the modulated signal and thus, may be a modulator and the multiplexer 229 generates the demodulated signal and thus, may be a demodulator.

Further, the first local oscillator 218 and the second local oscillator 225 do not generate the local oscillation signal through the phase shifters 217 and 224 and may generate the local oscillation signal by the direct control of the reference signal generator 215 or the clock signal controller 234.

Here, elements located on a signal transmitting path from the frame maker 211 to the antenna 222 may be divided as a transmitter and elements located on a signal receiving path from the antenna 222 to the multiplexer 229 may be divided as a receiver. Further, the low pass filter 230, the clock divider 231, the second analog to digital converter 232, the synchronizer 233, and the clock controller 234 that are located on another receiving path for acquiring signal synchronization may be included in the receiver.

Meanwhile, the reference signal generator 215, the clock generator 216, the phase shifters 217 and 224, and the local oscillators 218 and 225 may be located at the signal transmitter and the signal receiver, respectively.

As such, the present invention uses the analog to digital converter and the digital to analog converter that process the low bit at high speed and uses the digital to analog converter that processes the high bit for frequency synchronization and time synchronization on the receiving path at low speed, thereby providing the apparatus for transmitting and receiving a signal with the improved digital modulation performance. Further, the digital to analog converter for frequency synchronization and time synchronization may implement the inexpensive apparatus for transmitting and receiving a signal by using the low-speed analog to digital converter.

Figure 3:
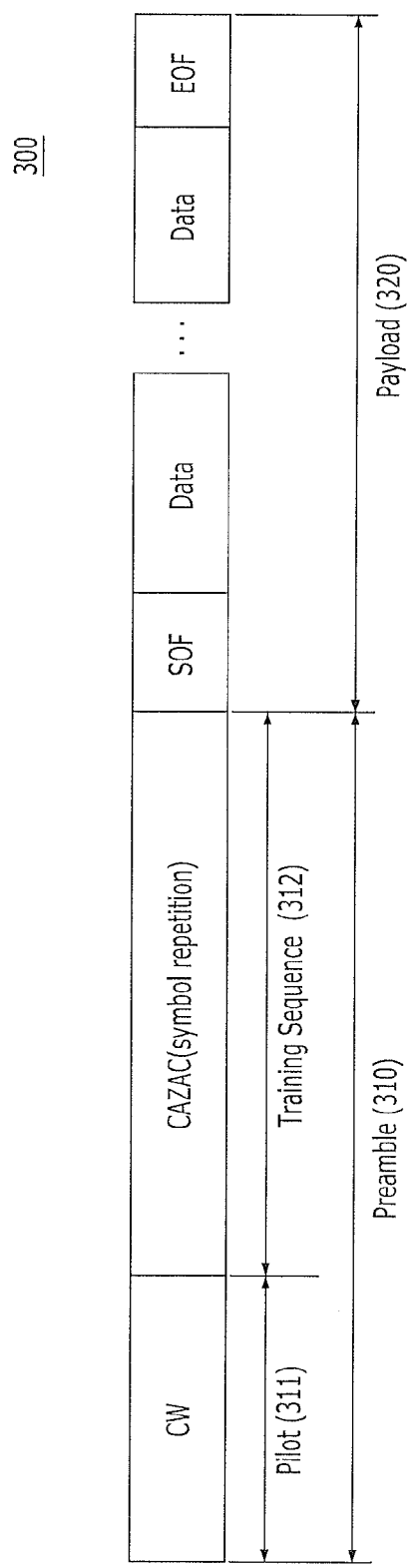
FIG. 3 is a diagram illustrating a frame structure made by a frame maker in the communication system in accordance with the embodiment of the present invention.

FIG. 3 is a diagram illustrating a frame structure made by a frame maker in the communication system in accordance with the embodiment of the present invention.

Referring to FIG. 3, the frame 300 made by the frame maker includes a preamble 310 including a signal for synchronization acquisition at the receiving end and a payload 320 including an actually transmitted data signal.

The preamble 310 includes a pilot 311 and a training sequence 312.

The pilot 311 may be configured of, for example, a continuous wave (CW) (for example, continuous sinusoidal signal). Therefore, a deviation in a frequency and a phase may be calculated at the receiving end based on the pilot 311.

The training sequence 312 may be configured of, for example, a sequence of a form in which symbols are repeated, in more detail, a CAZAC sequence. The training sequence 312 has the same size as the CAZAC sequence and may be configured of a training sequence signal having correlation of 0 and a low symbol rate due to a symbol delay.

The payload 320 includes, for example, a start of frame (SOF), a data, and an end of frame (EOF). The payload 320 is an area in which a data signal to be actually transmitted is included.

However, the frame 300 described in FIG. 3 is described by way of example and may be non-continuously configured of a plurality of continuous wave sinusoidal signals, a plurality of training sequence signals, and a plurality of data signals.

When using the preamble having the above structure, a difference in a bandwidth occurs due to the data transmission between the preamble 310 and the payload 320. The difference in a bandwidth will be described below with reference to FIG. 4.

Figure 4:
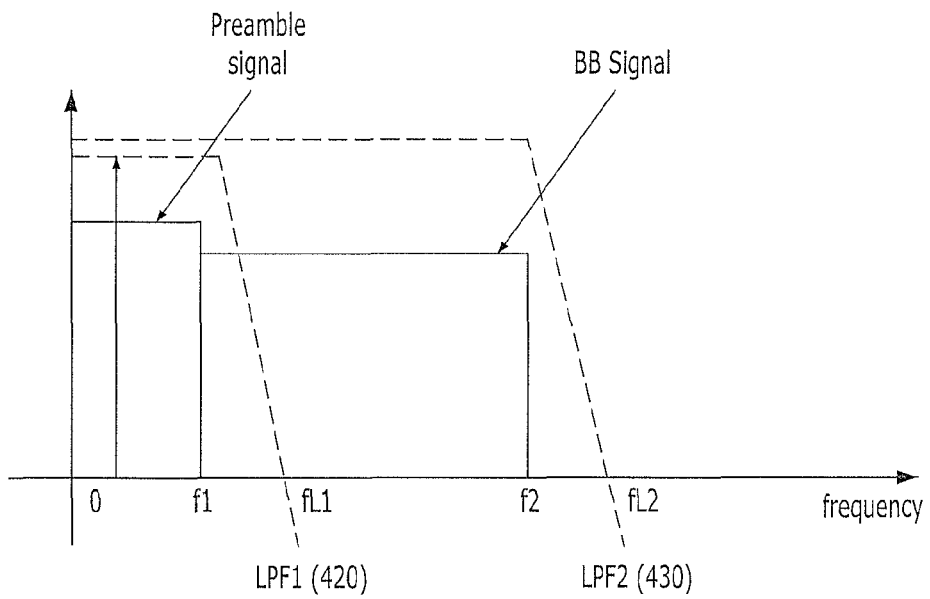
FIG. 4 is a diagram illustrating a spectrum of a signal to which a frame structure used in the signal transceiver of the communication system in accordance with the embodiment of the present invention is applied.

FIG. 4 is a diagram illustrating a spectrum of a signal according to a frame structure used in the signal transceiver of the communication system in accordance with the embodiment of the present invention.

Referring to FIG. 4, a horizontal axis of a graph represents a frequency band. The difference in a bandwidth occurs between the preamble 310 and the payload 320. The preamble 310 of the frame 300 is set to be a low frequency band (for example, f1) as maximally as possible in consideration of system performance. Through this, the preamble 310 has a difference from the payload 320 in terms of the transmission frequency bandwidth. For example, the payload 320 is set to be a relatively higher frequency band f2. Therefore, it can be checked that the preamble 310 may be transmitted through a relatively lower frequency band than the payload 320. Therefore, when transmitting the signal for synchronization, the analog to digital converter may perform sampling at a symbol rate reduced by a narrow bandwidth and the inexpensive high-bit analog to digital converter meeting a lower speed may be used.

Even though a deviation in a frequency is 10 pulse per minute (PPM), the deviation in a frequency is in the range of 90 GHz to 900 Hz. Therefore, frequency selective fading does not largely occur in the signal transceiver using a millimeter wave band in the case of ling of sight (LOS) communication.

Figure 5:
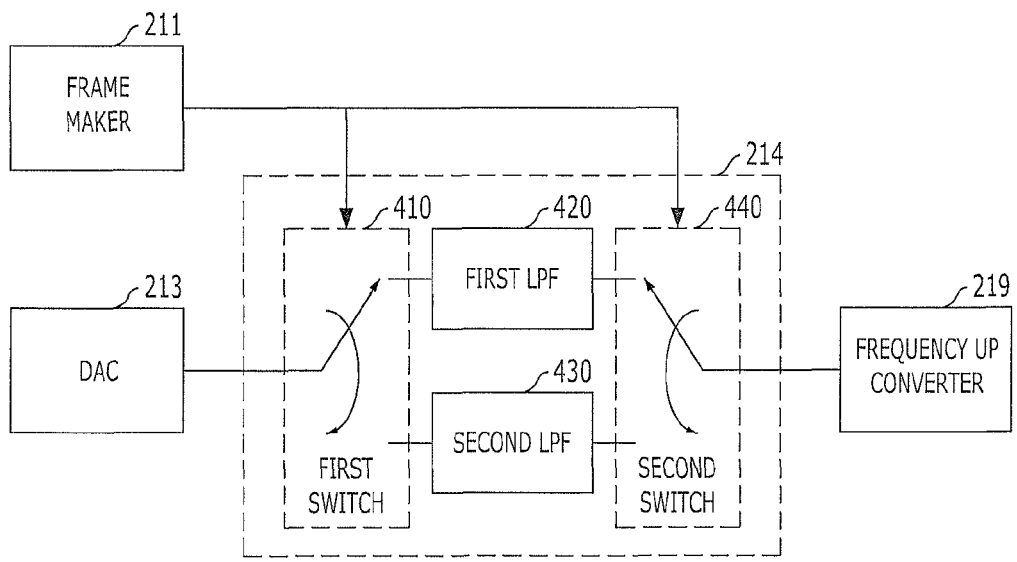
FIG. 5 is a diagram illustrating a low pass filter in the communication system in accordance with the embodiment of the present invention.

FIG. 5 is a diagram illustrating a low pass filter block in the communication system in accordance with the embodiment of the present invention.

Referring to FIG. 5, a low pass filter block 214 includes a first switch 410, a first low pass filter 420, a second low pass filter 430, and a second switch 440.

The first switch 410 receives signals output from the digital to analog converter 213. The first switch 410 is switched to output the signals to one of the first low pass filter 420 and the second low pass filter 430. In this case, the first switch 410 may perform a control to output the preamble 310 to the first low pass filter 420 and the payload 320 to the second low pass filter 430 according to a control of the frame maker 211.

The first low pass filter 420 filters the preamble 310. The first low pass filter 420 filters the preamble in a frequency band less than 'f1' and outputs the filtered signal to the second switch 440. To this end, the filtering band of the first low pass filter 420 becomes 'fL1' larger than 'f1'.

The second low pass filter 430 filters the payload 320. The second low pass filter 430 filters the payload in a frequency band less than 'f2' and outputs the filtered signal to the second switch 440. To this end, the filtering band of the second low pass filter 430 becomes 'fL2' larger than 'f2'.

The second switch 440 is switched to output the signals output from the first low pass filter 420 and the second low pass filter 430 to the frequency up converter 219. In this case, the second switch 440 performs a control to output the filtered preamble from the first low pass filter 420 to the frequency up converter 219 and the filtered payload from the second low pass filter 430 to the frequency up converter 219 according to the control of the frame maker 211.

For example, the first switch 410 and the second switch 420 may be implemented by a single pole double throw (SPDT) switch.

Figure 6:
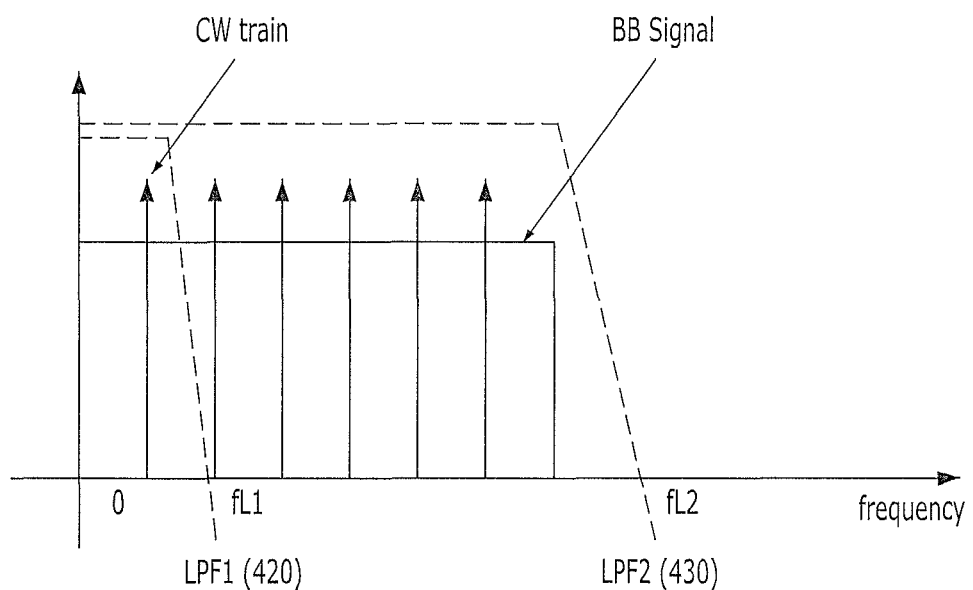
FIG. 6 is a diagram illustrating a spectrum forming a continuous single frequency waveform in the communication system in accordance with the embodiment of the present invention.

FIG. 6 is a diagram illustrating a spectrum forming a continuous single frequency waveform in the communication system in accordance with the embodiment of the present invention.

Referring to FIG. 6, when the frame maker 211 generates a difference at a multiple of 2 even though the bandwidth is limited by the first low pass filter 420, the synchronization instant is the same and therefore, when the low bandwidth signal is used, the signal transceiver corresponding to the signal transceiver 200 can acquire synchronization (for example, time synchronization).

The frame maker 211 generates the difference in a frequency between the continuous wave signal, for example, the sinusoidal signal at the multiple of 2. In this case, the digital to analog converter 213 processes 1 bit and therefore, the frame maker 211 may implement the sinusoidal signal of the preamble 310 as, for example, '1010110 . . . '. Further, the frame maker 211 may generate the CAZAC sequence of the preamble 310 by the repetition of a constant symbol.

Through this, the preamble 310 is filtered by the first low pass filter 420 and the payload 320 that is a baseband signal (BB signal) is filtered by the second low pass filter 430.

Therefore, the frame maker 211 controls the switches 410 and 440 so as to filter the preamble 310 by the first low pass filter and controls the switches 410 and 440 so as to filter the payload 320 by the second low pass filter 430 according to the generation of the frame.

Figure 7:
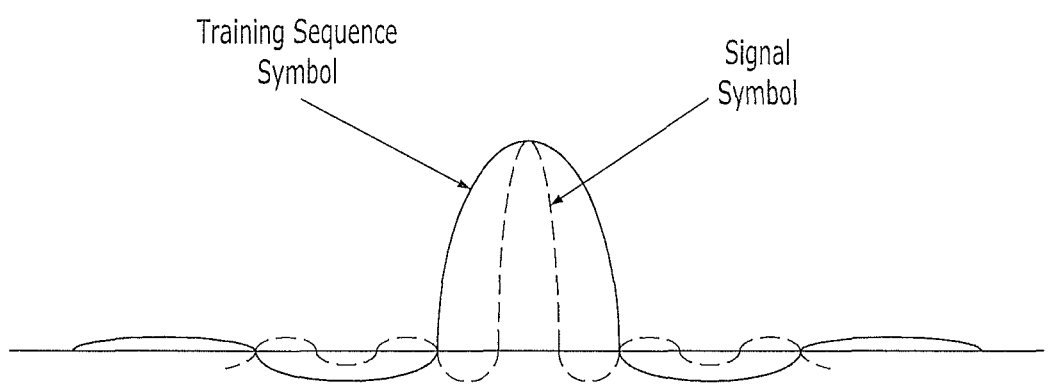
FIG. 7 is a diagram for describing an acquisition of time synchronization in the communication system in accordance with the embodiment of the present invention.

FIG. 7 is a diagram for describing an acquisition of time synchronization in the communication system in accordance with the embodiment of the present invention.

Referring to FIG. 7, a sold line in a spectrum illustrates a spectrum for the training sequence symbol of the preamble 310 and a dotted line in a spectrum illustrates a spectrum for a signal (or data) symbol of the payload 320.

The spectrums for a continuous single frequency waveform for the preamble 310 and the payload 320 are illustrated.

Figure 8:
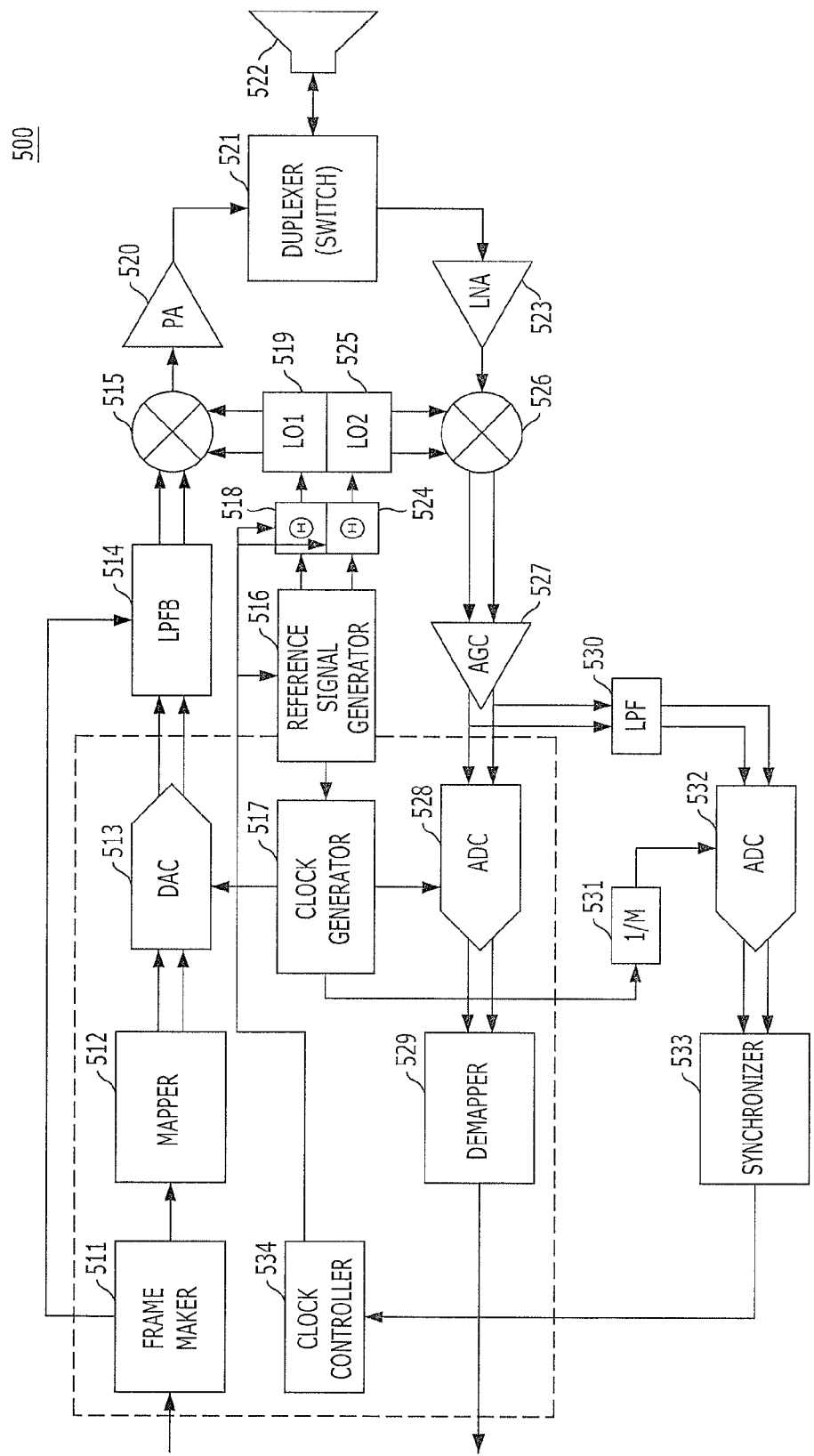
FIG. 8 is a diagram illustrating a structure of the signal transceiver in which the low-bit analog to digital conversion technology in accordance with the embodiment of the present invention is applied to an M-array orthogonal amplitude modulation (QAM) type.

FIG. 8 is a diagram illustrating a structure of the signal transceiver in which the low-bit analog to digital conversion technology in accordance with the embodiment of the present invention is applied to an M-array orthogonal amplitude modulation (QAM) type.

Referring to FIG. 8, a signal transceiver 500 may include a frame maker 511, a mapper 512, a digital to analog converter 513, a low pass filter block 514, a frequency up converter 515, a reference signal generator 516, a clock generator 517, a first phase shifter 518, a first local oscillator 519, a power amplifier 520, a duplexer (or switch) 521, an antenna 522, a low noise amplifier 523, a second phase shifter 524, a second local oscillator 525, a frequency down converter 526, an automatic gain controller 527, a first analog to digital converter 528, a demapper 529, a low pass filter 530, a clock divider 531, a second analog to digital converter 532, a synchronizer 533, and a clock controller 534.

In this configuration, a structure of the signal transceiver 500 is similar to a structure of the signal transceiver 200 of FIG. 2. The signal transceiver 500 may be applied to, for example, quadrature phase shift keying (QPSK) modulation. In addition, the signal transceiver 500 may be applied to the signal transceiver that transmits and receives data in a high-order modulation type of 16 quadrature amplitude modulation (QAM) or more.

To this end, the signal transceiver 500 has a difference in the digital to analog converter 513 and the first analog to digital converter 528 that can process multiple bits (m bits) for M-array QAM modulation, unlike the signal transceiver of FIG. 2. In addition, the signal transceiver 500 has a difference in using the mapper 512 and the demapper 529, instead of using the demultiplexer 212 and the multiplexer 229 for modulation and demodulation.

Therefore, the structure of the remaining signal transceiver 500 except for the mapper 512, the digital to analog converter 513, the first analog to digital converter 528, and the demapper will refer to the description of the signal transmitter 200 of FIG. 2.

The mapper 512 maps the received frame from the frame maker 511. The mapper 512 maps the data of the received frame to correspond to the corresponding modulation type. The mapper 512 outputs the mapped frame data to the digital to analog converter 513.

The digital to analog converter 513 converts the mapped frame data into analog signals. In this configuration, the digital to analog converter 513 is a digital to analog converter that processes multiple bits (for example, m-bit). The digital to analog converter 513 outputs the converted analog signals to the low pass filter block 514.

Meanwhile, the first analog to digital converter 528 converts the gain controlled signals into the digital signals. In this configuration, the first digital to analog converter 528 is an analog to digital converter that processes multiple bits (for example, m-bit). The first analog to digital converter 528 outputs the digital converted signals to the demapper 529.

The demapper 529 demaps the digital converted signals into a single signal to generate a baseband signal. The demapper 529 outputs the baseband signal.

In this configuration, the digital to analog converter 513 and the first analog to digital converter 528 are the analog to digital converter or the digital to analog converter of m-bit (for example, 16 bits) for the M-array QAM modulation, rather than the high-bit digital to analog converter or analog to digital converter. To this end, the mapper 512 has a modulation function and the demapper 529 has a demodulation function.

As such, in the signal transceiver in accordance with the exemplary embodiment of the present invention, the digital to analog converter and the analog to digital converter that are used in the transmitting path of the signal and the receiving path of the signal process a low bit at high speed. As the low-bit digital to analog converter and the low-bit analog to digital converter with the simple form perform the high-speed signal processing, the inexpensive analog to digital converter and digital to analog converter may be used.

Further, in the signal transceiver in accordance with the exemplary embodiment of the present invention, the analog to digital converter used to acquire the synchronization information for the synchronization of the signal processes a high bit at a low speed. The analog to digital converter that processes a high bit at low speed may be implemented at low price and may implement the time synchronization with the frequency at low processing speed.

Through this, the exemplary embodiment of the present invention may reduce costs and power consumption required to implement the signal transceiver that can process a high-speed digital signal using a broadband signal of several GHz in a millimeter wave band.

Further, the signal transceiver that is used for the QPSK modulation and the signal processing of 16QAM or more can be used and may be applied to the communication system having the millimeter wave band and the wireless environment in which the frequency selective fading is small or the RF type of communication system using a wire.

For convenience of explanation, the exemplary embodiment of the present invention illustrates a structure of a single signal transceiver, but the signal transceiver may be divided into a transmitter that transmits a signal and a receiver that receives a signal. Further, the signal transceiver communicates with the signal transceiver having the corresponding structure.

As described above, although the present invention is described by the limited embodiments and drawings, the present invention is not limited to the above-described. Various forms of substitutions, modifications and alterations may be made by those skilled in the art from the above description without departing from the spirit of the prevent invention.

Accordingly, the scope of the present invention is not construed as being limited to the described embodiments but is defined by the appended claims as well as equivalents thereto.

In accordance with the embodiments of the present invention, it is possible to reduce costs consumed to configure the signal transceiver and power consumed to transmit and receive a signal by implementing the signal transceiver using both of the digital to analog converter and the analog to digital converter processing the low bit at high speed or processing the high bit at low speed in the communication system.

Meanwhile, the embodiments is described in detail in the detailed description of the present invention, but may be variously modified without departing from the scope of the present invention. Accordingly, the scope of the present invention is not construed as being limited to the described embodiments but is defined by the appended claims as well as equivalents thereto.

What is claimed is:

1. An apparatus for transmitting a signal in a communication system, comprising:
   a frame maker configured to generate a frame for transmission from a baseband signal;

a modulator configured to modulate the frame into a plurality of modulated signals;

a digital to analog converter configured to convert the modulated signals into analog signals;

a clock generator configured to generate a clock signal for an operation of the digital to analog;

a low pass filter block configured to filter the analog signals in preset bands;

a frequency up converter configured to convert the filtered analog signals into frequency up converted signals;

a local oscillator configured to generate a local oscillation signal for the frequency up conversion; and a clock controller configured to control the generation of the local oscillation signal and the generation of the clock signal based on synchronization information.

2. The apparatus of claim 1, wherein the frame includes a preamble signal and a data signal and the preamble signal includes a continuous sinusoidal signal and a training sequence signal of a low symbol rate.

3. The apparatus of claim 2, wherein the low pass filter block performs low pass filtering on the preamble signal in a first frequency band and performs low pass filtering on the data signal in a second frequency band higher than the first frequency band, according to a control of the frame maker.

4. The apparatus of claim 1, wherein the modulator includes one of:
   a demultiplexer demultiplexing the frame into the plurality of modulated signals, and
   a mapper mapping the frame to the plurality of modulated signals.

5. The apparatus of claim 1, further comprising: a reference signal generator configured to generate a reference signal according to the control of the clock controller and output the generated reference signal to the clock generator; and a phase shifter configured to generate a phase shift signal according to the control of the clock controller and the reference signal and output the generated phase shift signal to the local oscillator.

6. An apparatus for receiving a signal in a communication system, comprising:
   a frequency down converter configured to convert received signals into a frequency down converted signals according to a local oscillation signal;
   a first analog to digital converter configured to convert the frequency down converted signals into first digital signals;
   a clock generator configured to generate a clock signal for an operation of the first analog to digital converter;
   a demodulator configured to output a baseband signal demodulating the first digital signals;
   a low pass filter configured to perform low pass filtering on the frequency down converted signals;
   a second analog to digital converter configured to convert the filtered frequency down converted signals into second digital signals;
   a divider configured to divide the clock signal for an operation of the second analog to digital converter;
   a synchronizer configured to acquire synchronization information from the second digital signals; and
   a clock controller configured to control the generation of the local oscillation signal and the generation of the clock signal based on the synchronization information.

7. The apparatus of claim 6, wherein the demodulator includes one of:
   a multiplexer multiplexing the first digital signals into a single modulated signal, and
   a mapper mapping the first digital signals to a single modulated signal.

8. The apparatus of claim 6, wherein a reference signal generator configured to generate a reference signal according to the control of the clock controller and output the generated reference signal to the clock generator; and a phase shifter configured to generate a phase shift signal according to the control of the clock controller and the reference signal.

9. An apparatus for transmitting and receiving a signal in a communication system, comprising:
   a frame maker configured to generate a frame for transmission from a baseband signal;
   a modulator configured to modulate the frame into a plurality of modulated signals;
   a digital to analog converter configured to convert the modulated signals into analog signals;
   a low pass filter block configured to filter the analog signals in preset bands;
   a frequency up converter configured to convert the filtered analog signals into frequency up converted signals a frequency down converter configured to convert received signals into frequency down converted signals;
   a first analog to digital converter configured to convert the frequency down converted signals into first digital signals;
   a demodulator configured to demodulate the first digital signals with a baseband signal;
   a low pass filter configured to perform low pass filtering on the frequency down converted signals;
   a second analog to digital converter configured to convert the filtered frequency down converted signals into second digital signals;
   a synchronizer configured to acquire synchronization information from the second digital signals; and
   a clock controller configured to control the generation of the local oscillation signal and the generation of the clock signal based on the synchronization information.

10. The apparatus of claim 9, wherein the frame includes a preamble signal including for synchronization acquisition and a payload signal including a data signal.

11. The apparatus of claim 10, wherein the preamble signal includes a pilot signal and a training sequence signal, the pilot signal includes a continuous sinusoidal signal, and the training sequence signal includes a CAZAC sequence signal.

12. The apparatus of claim 10, wherein the low pass filter block includes:
    a first switch configured to switch the preamble signal to a second low pass filter and the payload signal to a third low pass filter according to a control of the frame maker;
    a second low pass filter configured to filter signals of a first frequency band or less;
    a third low pass filter configured to filter signals a second frequency band or less; and
    a second switch configured to switch filtered signals output from the second low pass filter and the third low pass filter to the frequency up converter according to the control of the frame maker, wherein the first frequency band is a frequency band that is less than the second frequency band.

13. The apparatus of claim 9, wherein the modulator includes a demultiplexer demultiplexing the frame into a plurality of demultiplexed signals, and the demodulator includes a multiplexer multiplexing the first digital signals to generate a baseband signal.

14. The apparatus of claim 9, wherein the modulator includes a mapper mapping the frame into a plurality of mapped signals, and the demodulator includes a demapper demapping the first digital signals to generate a baseband signal.

15. The apparatus of claim 9, further comprising:
a reference signal generator configured to generate a reference signal for the generation of a first local oscillation signal and a second local oscillation signal according to the control of the clock controller;
a phase shifter configured to generate a phase shift signal for controlling a phase of a transmitting and receiving signal from the reference signal according to the control of the clock controller; and
a local oscillator configured to generate the first local oscillation signal and the second local oscillation signal from the phase shift signal, provide the first local oscillation signal to the frequency up converter, and provide the second local oscillation signal to the frequency down converter.

16. The apparatus of claim 9, further comprising: a clock generator configured to generate a clock signal and provide the generated clock signal to the digital to analog converter and the first analog to digital converter according to the control of the clock controller; and a divider configured to divide the clock signal and provide the divided clock signal to the second analog to digital converter.

17. The apparatus of claim 9, wherein the synchronization information includes information on frequency, phase, and time.

* * * * *